(12) United States Patent
Chung et al.

(10) Patent No.: US 7,496,422 B2
(45) Date of Patent: Feb. 24, 2009

(54) METHOD FOR CONTROLLING A SEMICONDUCTOR PROCESSING APPARATUS

(75) Inventors: Jae-Woo Chung, Seoul (KR); Jun Jung, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 419 days.

(21) Appl. No.: 11/284,813

(22) Filed: Nov. 23, 2005

(65) Prior Publication Data

US 2006/0276926 A1 Dec. 7, 2006

(30) Foreign Application Priority Data

Jun. 3, 2005 (KR) .................. 10-2005-0047712

(51) Int. Cl.
*G06F 19/00* (2006.01)
(52) U.S. Cl. .................. 700/110; 700/96; 700/121; 702/183; 707/203
(58) Field of Classification Search .............. 700/96, 700/108–111, 121; 702/182–185; 707/203; 717/110, 170
See application file for complete search history.

(56) References Cited

U.S. PATENT DOCUMENTS 5,461,559 A * 10/1995 Heyob et al. .................. 700/29
6,735,493 B1 * 5/2004 Chou et al. ................. 700/121
6,957,116 B2 * 10/2005 Tsai et al. .................... 700/109
6,975,917 B2 * 12/2005 Sakamoto et al. ........... 700/121

FOREIGN PATENT DOCUMENTS

| JP | 11-016798 | 1/1999 |
| KR | 1998-068085 | 10/1998 |
| KR | 1998-068320 | 10/1998 |
| KR | 1999-026068 | 4/1999 |

* cited by examiner

*Primary Examiner*—Sean P Shechtman
(74) *Attorney, Agent, or Firm*—Volentine & Whitt, PLLC

(57) ABSTRACT

A method for controlling a batch-type semiconductor processing apparatus is provided. The method checks whether a recipe set based on basic process information is within a recipe group stored in the semiconductor processing apparatus. The method also checks whether the quantity of wafers read through lot mapping is correlated to the quantity of wafers indicated by the basic process information. During the semiconductor fabrication process, the method also checks whether a current recipe of the semiconductor processing apparatus is correlated to the set recipe.

15 Claims, 3 Drawing Sheets

METHOD FOR CONTROLLING A SEMICONDUCTOR PROCESSING APPARATUS

BACKGROUND OF THE INVENTION

1. Field of the Invention

The present invention relates to a method for controlling a semiconductor processing apparatus, and more particularly, to a method for controlling a batch-type semiconductor processing apparatus.

This application claims priority to Korean Patent Application No. 2005-47712, filed on Jun. 3, 2005, the subject matter of which is hereby incorporated by reference in its entirety.

2. Description of the Related Art

Batch-type and plate-type semiconductor processing apparatuses may each be used to perform a semiconductor fabrication process. Batch-type semiconductor processing apparatuses are used for processing semiconductors by the lot, and plate-type semiconductor processing apparatuses are used for processing semiconductors by the wafer.

Use of a batch-type semiconductor processing apparatus in a semiconductor fabrication process may result in more process-related faults relative to the use of an analogous plate-type semiconductor processing apparatus. However, a batch-type semiconductor processing apparatus has a relatively higher throughput than a plate-type semiconductor processing apparatus.

Many solutions have been proposed to the problem of excessive process-related faults caused by the use of batch-type semiconductor processing apparatuses. In one conventional solution, where data received from a host computer is not correlated to a data set for a target lot, a related control method may be used to halt operation of the semiconductor processing apparatus. Thereafter, wafers may be unloaded from the lot being processed by the semiconductor processing apparatus, thereby preventing potential process-related faults from occurring. In contrast, where the received data is correlated to the data set for the target lot, the subject semiconductor fabrication process may be performed in accordance with the received data.

This conventional solution is, however, not without its drawbacks. For example, the control method may not adequately check whether the received data is practicable for the semiconductor processing apparatus. That is, the received data may fall within allowable specification ranges, yet may not correspond to a fabrication recipe practically suited to the target semiconductor processing apparatus.

A semiconductor processing apparatus may store recipes used to perform many semiconductor fabrication processes. The recipes stored in a semiconductor processing apparatus will be referred to as a recipe group. If a recipe received from a host computer is not contained in the recipe group of the target semiconductor processing apparatus, the recipe may not lead to a successful semiconductor fabrication process.

Even where a semiconductor fabrication process starts according to appropriate data, the data may be altered by an operator or by errant communication factors during the semiconductor fabrication process. The conventional method has no way of verifying whether the altered data is valid. The conventional method may also lack the ability to check whether current data generated in relation to the semiconductor processing apparatus is properly correlated to set data. Any one of these failures may result in process-related faults.

Further, the conventional method may not properly consider the quantity of wafers actually in a lot being processed. As a result, once wafers are loaded into a semiconductor processing apparatus, it is possible that some portion of the wafers may thereafter be unloaded from the semiconductor processing apparatus without having undergone the fabrication process. It is also possible that a semiconductor fabrication process may proceed without the wafers actually having been loaded into the semiconductor processing apparatus. For example, if the semiconductor processing apparatus incorrectly reads the quantity of wafers in a lot, a semiconductor fabrication process may be performed in relation to an incorrectly identified quantity of wafers, thereby resulting in process-related faults.

SUMMARY OF THE INVENTION

Embodiments of the invention recognize one or more of the deficiencies noted above in relation to conventional methods intended to address the problem of process-related faults in batch-type semiconductor processing apparatuses.

For example, in one embodiment, the invention provides a method for controlling a semiconductor processing apparatus, the semiconductor processing apparatus comprising a recipe group, the method comprising setting processing conditions, wherein the processing conditions comprise a recipe, loading a lot into the semiconductor processing apparatus, performing a validation process to determine whether a set recipe is within the recipe group, starting a semiconductor fabrication process if the set recipe is within the recipe group, and performing an invariability check process during the semiconductor fabrication process, wherein the invariability check process determines whether a current recipe of the semiconductor processing apparatus is correlated to the set recipe.

In another embodiment, the invention provides a method for controlling a semiconductor processing apparatus having a recipe group. The method comprises inputting basic process information to a host from an operator interface. Thereafter, by operation of the host, a recipe is set based on the basic process information. The method further comprises loading a lot into the semiconductor processing apparatus, performing a validation process for checking whether the set recipe is within the recipe group, applying the set recipe to the semiconductor processing apparatus if the set recipe is within the recipe group, performing an identification process to determine whether the quantity of wafers read through lot mapping is correlated to the quantity of wafers indicated by the basic process information, performing a preparation process if the quantity of wafers read through lot mapping is correlated to the quantity of wafers indicated in the basic process information, performing a first check process for checking, immediately after the preparation process, whether a current recipe in the semiconductor processing apparatus is correlated to the set recipe, performing a main process if the current recipe is correlated to the set recipe, performing a second check process to determine, before the main process, whether the current recipe in the semiconductor processing apparatus is correlated to the set recipe, and continuing the semiconductor fabrication process according to the set recipe if the current recipe in the semiconductor processing apparatus is correlated to the set recipe.

BRIEF DESCRIPTION OF THE DRAWINGS

Exemplary embodiments of the invention will be described with reference to the accompanying drawings, wherein like reference numerals designate like and corresponding structural elements. In the drawings.

DESCRIPTION OF EXEMPLARY EMBODIMENTS

Figure 1:
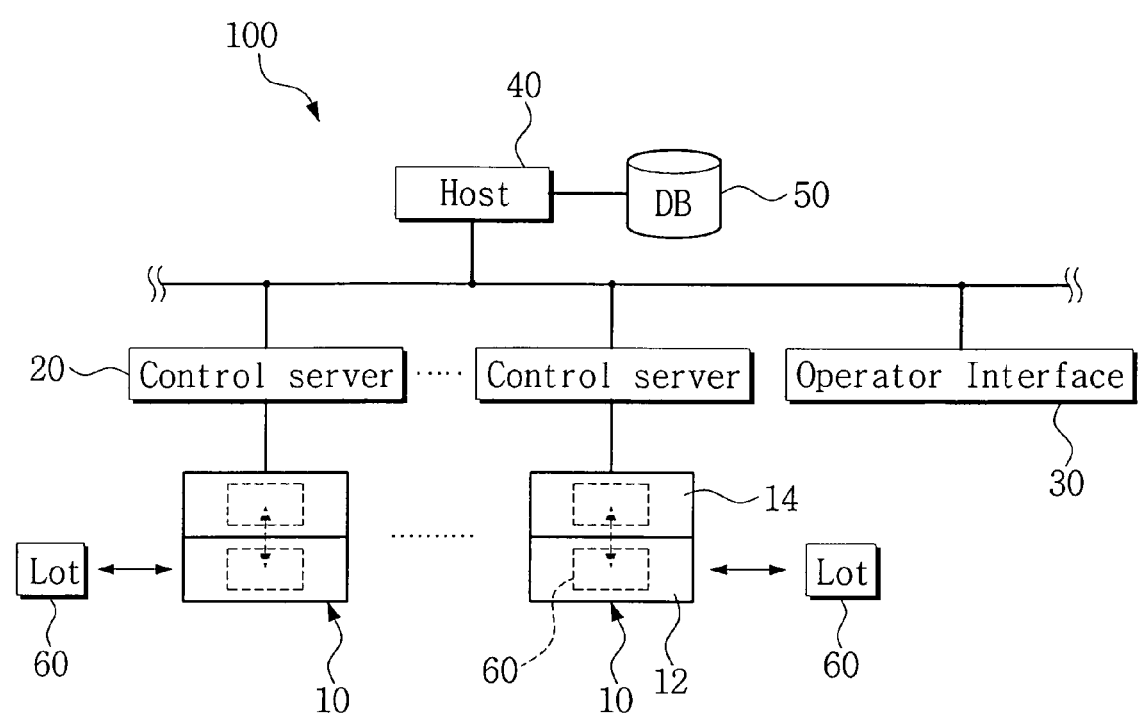
FIG. 1 is a block diagram of a control system for a batch-type semiconductor processing apparatus in accordance with an exemplary embodiment of the invention.

Referring to FIG. 1, a control system 100 may comprise a control server 20, an operator interface 30, a host 40, and a database 50.

A plurality of semiconductor processing apparatuses 10 arranged in semiconductor fabrication lines may be connected on-line to host 40 through control server 20. Operator interface 30 may also be connected on-line to host 40. The on-line communication method may use a semiconductor standard protocol, for example, SECS ((Semiconductor equipment and materials international) Equipment Communication Standard) 26, or HSMS (High-Speed Message Services).

Each semiconductor processing apparatus 10 may store recipes (i.e., process and associated input parameter values) related to semiconductor fabrication processes. Each semiconductor processing apparatus 10 may also comprise software adapted to store the recipes. The recipes stored in a semiconductor processing apparatus 10 will be referred to hereinafter as a recipe group.

Each semiconductor processing apparatus 10 may comprise a loadlock chamber 12 and a process chamber 14 connected to loadlock chamber 12. A lot 60 may be provided to a loadlock chamber 12 of a target semiconductor processing apparatus 10 by an operator or by automated means. Lot 60 may comprise a plurality of wafers. The automated means may include a rail guided vehicle, an automatic guided vehicle, and a laser guided vehicle, and may be driven by an order of host 40. When lot 60 is loaded into loadlock chamber 12 of target semiconductor processing apparatus 10, target semiconductor processing apparatus 10 may read information about lot 60 that comprises the quantity of wafers in lot 60. The operation of reading this information will be referred to as lot mapping. Lot 60 may be conveyed from loadlock chamber 12 of target semiconductor processing apparatus 10 to process chamber 14 of target semiconductor processing apparatus 10 during a semiconductor fabrication process.

Control server 20 may connect each semiconductor processing apparatus 10 to operator interface 30 and to host 40. Control server 20 may run a control program adapted to control the plurality of semiconductor processing apparatuses 10. The control program may comprise checking logic adapted to check potential fault factors. An operator may input basic process information through operator interface 30 to perform a track-in operation. The control program may also control target semiconductor processing apparatus 10. The checking logic may check potential fault factors before and/or after a semiconductor fabrication process has begun.

Operator interface 30 may be connected on-line to control server 20 and host 40. An operator may input basic process information to host 40 through operator interface 30. The operator may also check the semiconductor fabrication process and input and/or receive necessary process information through operator interface 30.

Host 40 may control target semiconductor processing apparatus 10 and control server 20. Host 40 may search database 50 based on the basic process information and may set processing conditions based on the basic process information. The processing conditions may comprise a recipe available for lot 60 and the quantity of wafers in lot 60. The processing conditions may also be transmitted to control server 20.

Database 50 may store recipes available for each semiconductor processing apparatus 10. Database 50 may also transmit data to host 40 according to a signal of host 40.

The recipe set based on the basic process information will be known as the "set recipe". The checking logic may check whether the set recipe is within the recipe group stored in target semiconductor processing apparatus 10. The checking logic may also check whether the quantity of wafers indicated by the basic process information is correlated to (e.g., equal in number with) the quantity of wafers read by target semiconductor processing apparatus 10 through lot mapping. The checking logic may also check, during the semiconductor fabrication process, whether a current recipe of target semiconductor processing apparatus 10 is correlated to the set recipe.

A method for controlling a batch-type semiconductor processing apparatus will now be described with reference to FIGS. 1 through 3.

Figure 2:
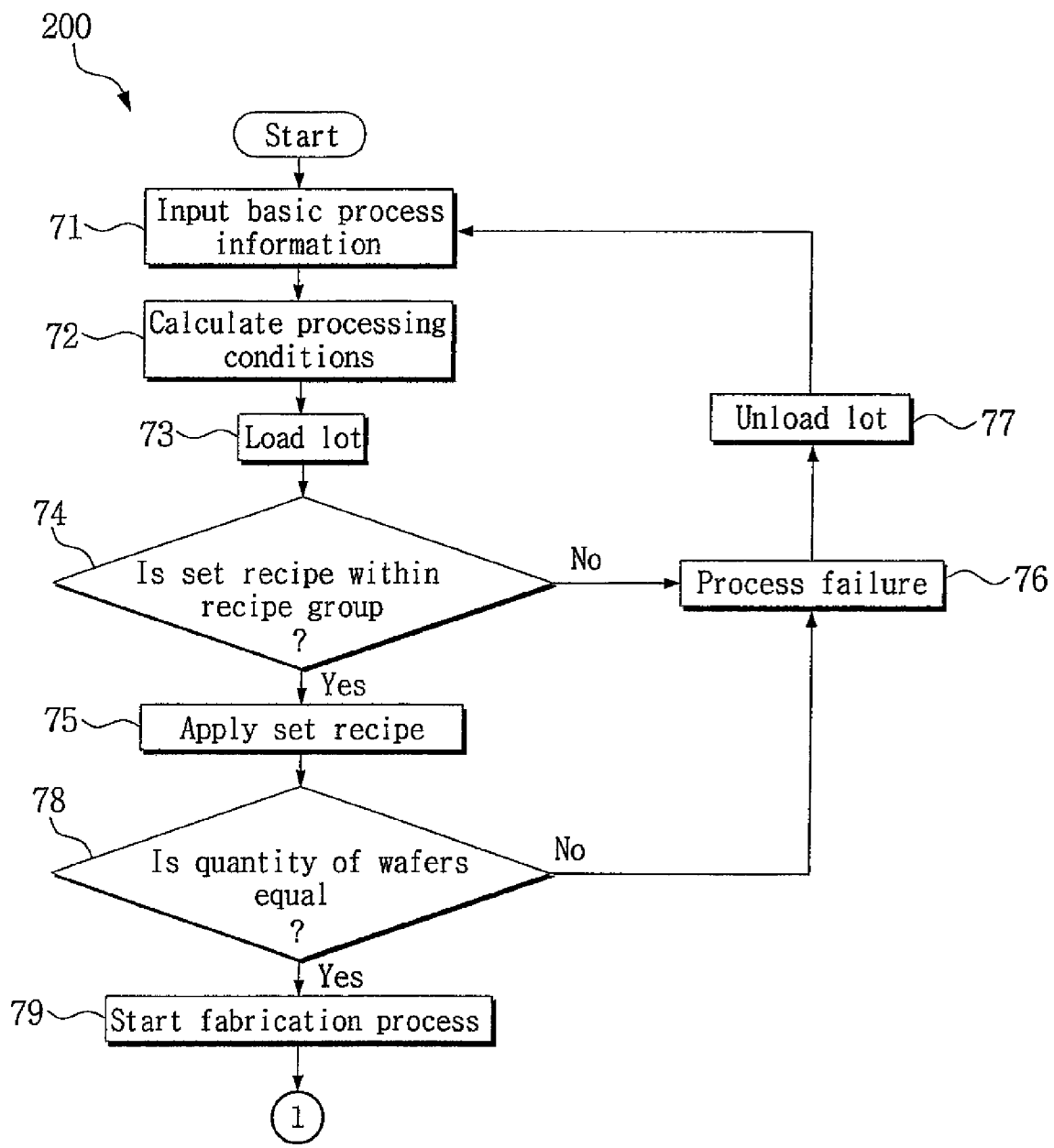
FIGS. 2 and 3 are flow charts of a method for controlling a batch-type semiconductor processing apparatus using the control system in FIG. 1.

Referring to FIG. 2, an operator may input basic process information to host 40 through operator interface 30 (71). The basic process information may include process items, for example, the identification (ID) of a target lot 60, the quantity of wafers in target lot 60, the ID of a target semiconductor processing apparatus 10, and the ID and a specification for a recipe.

Host 40 may search database 50 based on the basic process information and set processing conditions suitable for target lot 60 (72). The processing conditions may comprise the quantity of wafers and a recipe, and may be transmitted to control server 20.

Target lot 60 may be provided to target semiconductor processing apparatus 10 (73). Target lot 60 may be loaded into loadlock chamber 12 of target semiconductor processing apparatus 10 by the operator or by automated means.

Control server 20 may use a control program comprising checking logic to check potential fault factors before and/or after the semiconductor fabrication process has begun.

A validation process may be performed to determine whether or not the recipe set in target semiconductor processing apparatus 10 is within its recipe group (74). Control server 20 may read the recipe group stored in target semiconductor processing apparatus 10 and check whether or not the set recipe is within that recipe group.

If the set recipe is correlated to a recipe within the recipe group, the set recipe may be applied to target semiconductor processing apparatus 10 (75).

If the set recipe is not within the recipe group, control server 20 may determine that there is a process failure in the semiconductor fabrication process (76). Control server 20 may output a failure message through a display (not shown) installed in target semiconductor processing apparatus 10 or in operator interface 30, and unload lot 60 from loadlock chamber 12 (77). Target semiconductor processing apparatus 10 may then be initialized to return to the process for inputting the basic process information (71).

After the set recipe is applied to target semiconductor processing apparatus 10, an identification process may be performed to determine whether or not the quantity of wafers of target lot 60 indicated by the basic process information is correlated to the quantity of wafers in target lot 60 read by target semiconductor processing apparatus 10 through lot mapping (78). (In the illustrated example, proper correlation between the two wafer sets is defined as numerical equality, but this is just one example of being "correlated").

If the quantity of wafers in target lot 60 in accordance with the basic process information is correlated to the quantity of wafers read through lot mapping, the semiconductor fabrication process may automatically start in accordance with the set recipe (79).

If the quantity of wafers in target lot 60 in accordance with the basic process information is not correlated to the quantity of wafers read through lot mapping, control server 20 may determine that there is a process failure in the semiconductor fabrication process (76). Control server 20 may output a failure message through a display installed in target semiconductor processing apparatus 10 or in operator interface 30, and unload target lot 60 from loadlock chamber 12 (77). Target semiconductor processing apparatus 10 may then be initialized to return to the process for inputting the basic process information (71).

After the semiconductor fabrication process starts, an invariability check process may be performed to determine whether or not a current recipe of target semiconductor processing apparatus 10 is correlated to the set recipe to determine whether or not to continue the semiconductor fabrication process.

The semiconductor fabrication process may comprise a preparation process for creating a process atmosphere in process chamber 14 in accordance with the set recipe, and a main process in which target lot 60 is provided to process chamber 14 from loadlock chamber 12 of target semiconductor processing apparatus 10 and a substantial portion of the semiconductor fabrication process is performed.

Figure 3:
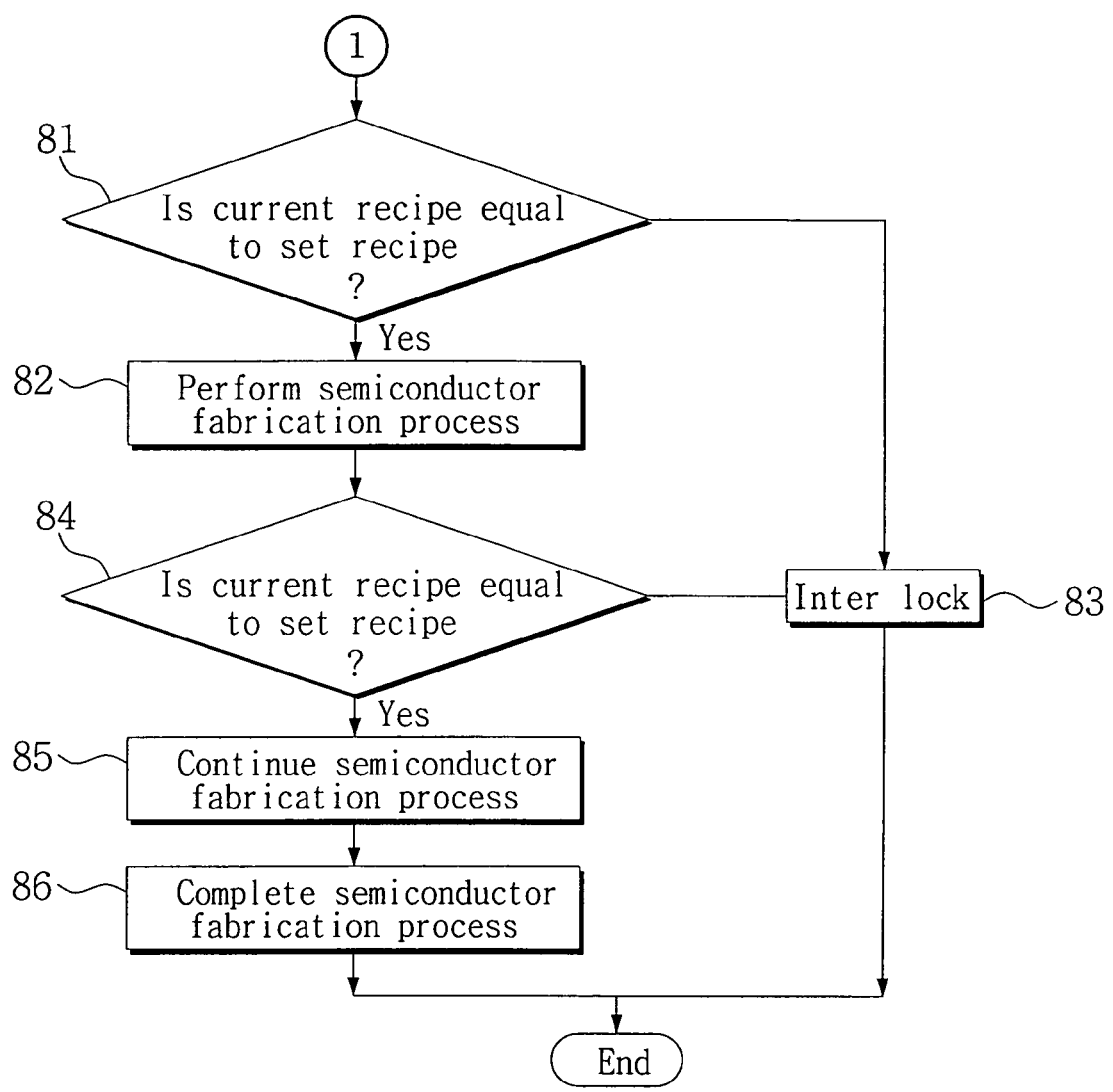

Referring to FIG. 3, the invariability check process may comprise a first check process for checking, after the start of the preparation process, whether or not a current recipe of target semiconductor processing apparatus 10 is correlated to the set recipe (81), and a second check process for checking, before the main process, whether or not the current recipe of semiconductor processing apparatus 10 is correlated to the set recipe (84).

As described above, the first and second check processes may be performed before the main process. These processes may check potential fault factors before the main process, thereby reducing the likelihood of procedural faults that may result from an incorrect recipe. The main process may be a process during which a substantial portion of the semiconductor fabrication process may be performed in accordance with the set recipe. After target lot 60 is provided to process chamber 14 from loadlock chamber 12 and the main process starts, it is not valuable to check whether or not a current recipe of semiconductor processing apparatus 10 is correlated to the set recipe.

In more detail, the first check process may be performed immediately after the start of the preparation process. The second check process may be performed at a specific stage in the preparation process. The first and second checks may be made automatically or manually. The second check process is preferably performed immediately before the main process starts. The specific stage of the second check process may be designated by a step name or a step number.

Since the first check process is performed immediately after the start of the preparation process, potential faults may be caught before the preparation process, and thus, the loss of time and costs incurred by process faults in the preparation process may be reduced relative to conventional methods. Since the second check process is performed immediately before the main process, and thus, after the completion of the preparation process, variations in the recipe occurring during the preparation process may be caught before the main process begins, thereby preventing procedural faults which may occur during the main process.

At least one further check process may be performed during the preparation process.

If the results of the first check are that the current recipe is correlated to the set recipe, the preparation process may be performed (82).

If the results of the first check are that the current recipe is not correlated to the set recipe, control server 20 may interlock semiconductor processing apparatus 10 at its current stage (83). An interlocking method may include pausing target semiconductor processing apparatus 10, forcefully stopping the operation of target semiconductor processing apparatus 10 and re-starting the process, or electronically breaking down target semiconductor processing apparatus 10. Control server 20 may output an interlock message through a display installed in target semiconductor processing apparatus 10 or operator interface 30.

If the results of the second check are that the current recipe is correlated to the set recipe, the semiconductor fabrication process comprising the main process may be performed according to the set recipe (85). The semiconductor fabrication process may then be completed (86).

If the results of the second check are that the current recipe is not correlated to the set recipe, control server 20 may interlock target semiconductor processing apparatus 10 at its current stage (83). Control server 20 may also output an interlock message through a display installed in target semiconductor processing apparatus 10 or operator interface 30.

Although in this exemplary embodiment the checking logic is programmed in control server 20, the checking logic may be programmed in host 40. If the checking logic is programmed in host 40, a method for controlling a semiconductor processing apparatus may be performed in the same manner as when the checking logic is programmed in control server 20, except that host 40 may be used to perform check processes.

The checking logic may also be programmed in a separate server or module and be connected to a host on-line. If the checking logic is programmed in a separate server or module, a method for controlling a semiconductor processing apparatus may be performed in the same manner as when the checking logic is programmed in control server 20, except that the separate server or module may be used to perform check processes.

Although exemplary embodiments of the invention have been described in detail, it will be understood by those of ordinary skill in the art that many variations and/or modifications may be made while remaining within the scope of the invention as defined in the following claims.

What is claimed is:

1. A method of controlling a semiconductor processing apparatus, the semiconductor processing apparatus storing a recipe group and the method comprising:
setting processing conditions, wherein the processing conditions comprise a set recipe;
loading a lot into the semiconductor processing apparatus;
performing a validation process to determine whether the set recipe is within the recipe group;
performing an identification process, wherein the identification process comprises determining whether the quantity of wafers indicated by the basic process information is correlated to the quantity of wafers read by the semiconductor processing apparatus through lot mapping;
starting the semiconductor fabrication process according to the set recipe, if the quantity of wafers indicated by the basic process information is correlated through lot mapping to the quantity of wafers read by the semiconductor processing apparatus and if the set recipe is within the recipe group, or determining that there is a process failure in the semiconductor fabrication process and unloading the lot from the semiconductor processing apparatus, if the quantity of wafers indicated by the basic process information is not correlated through lot mapping to the quantity of wafers read by the semiconductor processing apparatus; and, performing an invariability check process during the semiconductor fabrication process, wherein the invariability check process determines whether a current recipe of the semiconductor processing apparatus is correlated to the set recipe, wherein setting processing conditions comprises:
 inputting the basic process information to a host; and thereafter,
 by operation of the host, setting processing conditions based on the basic process information.

2. The method of claim 1, further comprising:
programming checking logic in a control server, wherein the checking logic is used in the identification process and the invariability check process.

3. The method of claim 1, further comprising:
programming checking logic in the host, wherein the checking logic is used in the identification process and the invariability check process.

4. The method of claim 1, wherein the invariability check process comprises continuing the semiconductor fabrication process if the current recipe is correlated to the set recipe, or interlocking the semiconductor processing apparatus if the current recipe is not correlated to the set recipe.

5. The method of claim 1, wherein determining whether the current recipe of the semiconductor processing apparatus is correlated to the set recipe is performed immediately after the start of the semiconductor fabrication process; and
 wherein the invariability check process further comprises performing an additional check process which comprises checking, during the semiconductor fabrication process, whether the current recipe is correlated to the set recipe.

6. The method of claim 5, further comprising:
continuing the semiconductor fabrication process if the current recipe is determined to be correlated to the set recipe based on the determination performed immediately after the start of the semiconductor fabrication process, or interlocking the semiconductor processing apparatus if the current recipe is determined not to be correlated to the set recipe based on the determination performed immediately after the start of the semiconductor fabrication process.

7. The method of claim 5, wherein the additional check process further comprises:
continuing the semiconductor fabrication process if the current recipe is correlated to the set recipe, or interlocking the semiconductor processing apparatus if the current recipe is not correlated to the set recipe.

8. The method of claim 7, wherein the additional check process is performed before the lot is provided to the process chamber.

9. A method of controlling a semiconductor processing apparatus, the semiconductor processing apparatus comprising a recipe group and the method comprising:
 inputting basic process information to a host from an operator interface; and thereafter,
 by operation of the host, setting a recipe based on the basic process information;
 loading a lot into the semiconductor processing apparatus;
 performing a validation process for checking whether the set recipe is within the recipe group;
 applying the set recipe to the semiconductor processing apparatus if the set recipe is within the recipe group;
 performing an identification process to determine whether the quantity of wafers read through lot mapping is correlated to the quantity of wafers indicated by the basic process information;
 performing a preparation process if the quantity of wafers read through lot mapping is correlated to the quantity of wafers indicated in the basic process information;
 performing a first check process for checking, immediately after the preparation process begins, whether a current recipe in the semiconductor processing apparatus is correlated to the set recipe;
 performing a main process if the current recipe is correlated to the set recipe;
 performing a second check process to determine, before the main process, whether the current recipe in the semiconductor processing apparatus is correlated to the set recipe; and,
 continuing the semiconductor fabrication process according to the set recipe if the current recipe in the semiconductor processing apparatus is correlated to the set recipe.

10. The method of claim 9, wherein checking logic is programmed in a control server and is used in the identification process and the first and second check processes.

11. The method of claim 9, wherein checking logic is programmed in the host and is used in the identification process and the first and second check processes.

12. The method of claim 9, wherein the validation process comprises determining that there is a process failure in the semiconductor fabrication process and unloading the lot from the semiconductor processing apparatus, if the set recipe is not within the recipe group and/or if the quantity of wafers read through lot mapping is not correlated to the quantity of wafers indicated by the basic process information.

13. The method of claim 12, wherein each of the first and second check processes comprise interlocking the semiconductor processing apparatus if the current recipe is not correlated to the set recipe.

14. The method of claim 13, wherein the preparation process is performed before the lot is provided to a process chamber of the semiconductor processing apparatus.

15. The method of claim 14, wherein, in the main process, the lot is provided to the process chamber of the semiconductor processing apparatus and undergoes a substantial portion of the semiconductor fabrication process.

* * * * *